(12) United States Patent
Gavin et al.

(10) Patent No.: US 7,934,011 B2
(45) Date of Patent: Apr. 26, 2011

(54) SYSTEM AND METHOD FOR FLOW CONTROL IN WEB-BASED VIDEO EDITING SYSTEM

(75) Inventors: Andrew Gavin, Pacific Palisades, CA (US); Scott Shumaker, Los Angeles, CA (US)

(73) Assignee: Flektor, Inc., Culver City, CA (US)

( * ) Notice: Subject to any disclaimer, the term of this patent is extended or adjusted under 35 U.S.C. 154(b) by 89 days.

(21) Appl. No.: 12/113,919

(22) Filed: May 1, 2008

(65) Prior Publication Data
US 2008/0275997 A1     Nov. 6, 2008

Related U.S. Application Data

(60) Provisional application No. 60/915,427, filed on May 1, 2007.

(51) Int. Cl.
*G06F 15/16* (2006.01)
(52) U.S. Cl. .................... 709/231; 709/232; 709/234
(58) Field of Classification Search .................. 709/231, 709/232, 234
See application file for complete search history.

(56) References Cited

U.S. PATENT DOCUMENTS

| | | | |
|---|---|---|---|
| 5,878,141 | A | 3/1999 | Daly et al. |
| 5,892,915 | A | 4/1999 | Duso et al. |
| 5,956,716 | A | 9/1999 | Kenner et al. |
| 6,269,394 | B1 | 7/2001 | Kenner et al. |
| 6,320,600 | B1 | 11/2001 | Smith et al. |
| 6,633,918 | B2 * | 10/2003 | Agarwal et al. ............... 709/231 |
| 6,654,506 | B1 | 11/2003 | Luo et al. |
| 6,710,785 | B1 | 3/2004 | Asai et al. |
| 6,993,787 | B1 | 1/2006 | Kamel et al. |
| 7,034,848 | B2 | 4/2006 | Sobol |
| 7,058,721 | B1 | 6/2006 | Ellison et al. |
| 7,158,676 | B1 | 1/2007 | Rainsford |

(Continued)

FOREIGN PATENT DOCUMENTS

JP          2006270587          10/2006

OTHER PUBLICATIONS

International Search Report for Application No. PCT/US08/62309 filed May 1, 2008, dated Jul. 2, 2008, mailed Jul. 14, 2008, 2 pages.

(Continued)

*Primary Examiner* — Nathan Flynn
*Assistant Examiner* — Mohamed Wasel
(74) *Attorney, Agent, or Firm* — Cantor Colburn LLP

(57) ABSTRACT

A web-based video editing system includes a communication device configured to: generate information indicative of points of interest of a video, the points of interest being indicative of one or more active data or one or more inactive data during a selected time interval; determine an identity of each of the active data, and a required amount of an identified active data during the selected time interval; and request the identified active data and the required amount of each of the identified active data. The system also includes: a web server configured to: receive the requested information, assign a unique identifier to the identified active data and transmit a redirect to the communication device. The system also includes: a custom web server configured to: receive and transmit to the communication device information indicative of the unique identifiers and the required amount of each of the identified active data.

23 Claims, 4 Drawing Sheets

U.S. PATENT DOCUMENTS

| | | | |
|---|---|---|---|
| 7,174,561 B2* | 2/2007 | Bixby et al. | 725/93 |
| 7,188,088 B2 | 3/2007 | Iwata et al. | |
| 7,302,274 B2 | 11/2007 | Makela et al. | |
| 7,606,926 B1* | 10/2009 | Chen et al. | 709/231 |
| 7,620,073 B2* | 11/2009 | Robinett et al. | 370/486 |
| 2001/0049715 A1 | 12/2001 | Kidder | |
| 2002/0032663 A1 | 3/2002 | Messner | |
| 2002/0114535 A1 | 8/2002 | Luo | |
| 2002/0116716 A1 | 8/2002 | Sideman | |
| 2002/0156910 A1* | 10/2002 | Senda | 709/232 |
| 2003/0028873 A1 | 2/2003 | Lemmons | |
| 2003/0122862 A1 | 7/2003 | Takaku et al. | |
| 2003/0140159 A1* | 7/2003 | Campbell et al. | 709/231 |
| 2003/0146915 A1 | 8/2003 | Brook et al. | |
| 2003/0234803 A1 | 12/2003 | Toyama et al. | |
| 2003/0234805 A1 | 12/2003 | Toyama et al. | |
| 2004/0228528 A1 | 11/2004 | Lao | |
| 2005/0025387 A1 | 2/2005 | Luo | |
| 2005/0084232 A1 | 4/2005 | Herberger et al. | |
| 2005/0114462 A1 | 5/2005 | Mathew et al. | |
| 2005/0132293 A1 | 6/2005 | Herberger et al. | |
| 2005/0210393 A1 | 9/2005 | Maeng | |
| 2005/0278636 A1 | 12/2005 | Nomoto | |
| 2005/0283547 A1 | 12/2005 | Parry et al. | |
| 2006/0023969 A1 | 2/2006 | Lara et al. | |
| 2006/0074769 A1 | 4/2006 | Looney et al. | |
| 2006/0095944 A1 | 5/2006 | Demircin et al. | |
| 2006/0129933 A1 | 6/2006 | Land et al. | |
| 2006/0156219 A1 | 7/2006 | Haot et al. | |
| 2006/0184980 A1 | 8/2006 | Cole | |
| 2006/0206526 A1 | 9/2006 | Sitomer | |
| 2006/0238827 A1 | 10/2006 | Ikeda et al. | |
| 2006/0253542 A1 | 11/2006 | McCausland et al. | |
| 2006/0288392 A1 | 12/2006 | Fleming | |
| 2007/0038703 A1 | 2/2007 | Tendjoukian et al. | |
| 2007/0189708 A1 | 8/2007 | Lerman et al. | |
| 2008/0052090 A1 | 2/2008 | Heinemann et al. | |
| 2008/0143875 A1 | 6/2008 | Scott et al. | |
| 2008/0172704 A1 | 7/2008 | Montazemi | |
| 2009/0196570 A1 | 8/2009 | Dudas et al. | |

OTHER PUBLICATIONS

Written Opinion for Application No. PCT/US08/62309 filed May 1, 2008, dated Jul. 2, 2008, mailed Jul. 14, 2008, 4 pages.

"iMovie HD Tutorial: Apple—iLife—Tutorials—iMovie HD—Arranging Your Clips;" http://www.apple.com/ilife; dated Oct. 9, 2006, 6 pages.

International Search Report and Written Opinion for PCT/US08/01138 dated Jun. 11, 2008, 6 pages.

International Search Report and Written Opinion for PCT/US08/01139 dtd May 14, 2008, 6 pages.

International Search Report and Written Opinion for PCT/US08/01130 dated Jun. 18, 2008, 6 pages.

International Search Report and Written Opinion for PCT/US08/52367 dated Apr. 9, 2008, 5 pages.

"Jumpcut—Create;" http://www.jumpcut.com/create/edit; dated Oct. 16, 2006, 3 pages.

"MAGIX;" http://site.magix.net; dated Oct. 12, 2006; 11 pages.

"MyHeritage face recognition," http://web.archive.org./web/20061018223823/www.myheritage.com/FP/Company/face-rec...; dated Aug. 24, 2008; 2 pages.

"Oddcast—Media Mixers;" http://www.oddcast.com/home; http://videomixer.chrysler.com/chrvideomixer.php?door=28&src=vm2chrysler.swf; dated Oct. 16, 2006, 20 pages.

"Planning and Using Infomercial Campaigns Effectively" dated Sep. 1, 1995 by Gene Silverman and published in Direct Marketing (hereinafter "Silverman"), pp. 1 to 8, 37 pages.

"Riya—Visual Search;" http://www.riya.com/learnMore; dated Aug. 25, 2008, 7 pages.

"Welcome to eyespot;" http://www.eyespot.com; dated Oct. 12, 2006, 8 pages.

* cited by examiner

SYSTEM AND METHOD FOR FLOW CONTROL IN WEB-BASED VIDEO EDITING SYSTEM

CROSS-REFERENCE TO RELATED APPLICATION(S)

This application claims priority to and the benefit of U.S. Provisional Application No. 60/915,427, filed on May 1, 2007, which is incorporated by reference as if set forth in full herein.

FIELD OF THE INVENTION

The present invention relates to web-based video editing systems, and more particularly, to a system and method for flow control in web-based video editing systems.

BACKGROUND OF THE INVENTION

Transmission of videos, slide shows accompanied with music and other such audiovisual sequences over the Internet is common. Transmission rates and bandwidth using the Internet are often limited and sometimes somewhat unpredictable. In this environment, it is common to use buffering on the receiving end of an audiovisual sequence transmission. For a number of reasons, including varying data rates within an audiovisual sequence, net congestion, server load, and receiver load, even though the average bandwidth to transmit an audiovisual sequence may be available between the sender and receiver of the sequence, the immediate bandwidth at a number of instances over the span of the audiovisual sequence may be less than the immediate bandwidth needed to transmit the audiovisual sequence. When a buffer is used at the receiver end, a data cushion is created so that during periods when the immediate bandwidth needed to transmit the audiovisual sequence is greater than the available bandwidth, the receiver will have previously transmitted data in reserve and will not have to pause or retard the recreation of the audiovisual sequence at the receiver end. Buffering is a simple technique that does not require any ongoing communication from the receiver to the sender or intelligence in the receiver.

SUMMARY OF THE INVENTION

A video system having flow control operates over a public network, such as the Internet. The system includes a network server that sends a data stream over the public network that is representative of an audiovisual sequence, such as a video. The audiovisual sequence including one or more temporal elements, such as audio or video that are ordinarily presented over a predetermined length of time, and one or more non-temporal elements, such as a poll that may remain part of the audiovisual sequence until a user provides some input, delaying other temporal or non-temporal elements. The system also includes a communication device, such as a home computer or web-enabled mobile phone, that receives the data stream, analyzes the data stream to determine a timing of when the temporal and non-temporal elements in the data stream will be displayed by the communication device. The communication device also determines a data rate requirement for a future period of time during the audiovisual sequence and sends a request to the server to send particular elements of the audiovisual sequence and a data rate requirement for the requested elements. The server includes the particular elements in the data stream and sends the elements in the data stream at a data rate according to the data rate requirement in the request from the communication device.

DETAILED DESCRIPTION OF THE INVENTION

Figure 1:
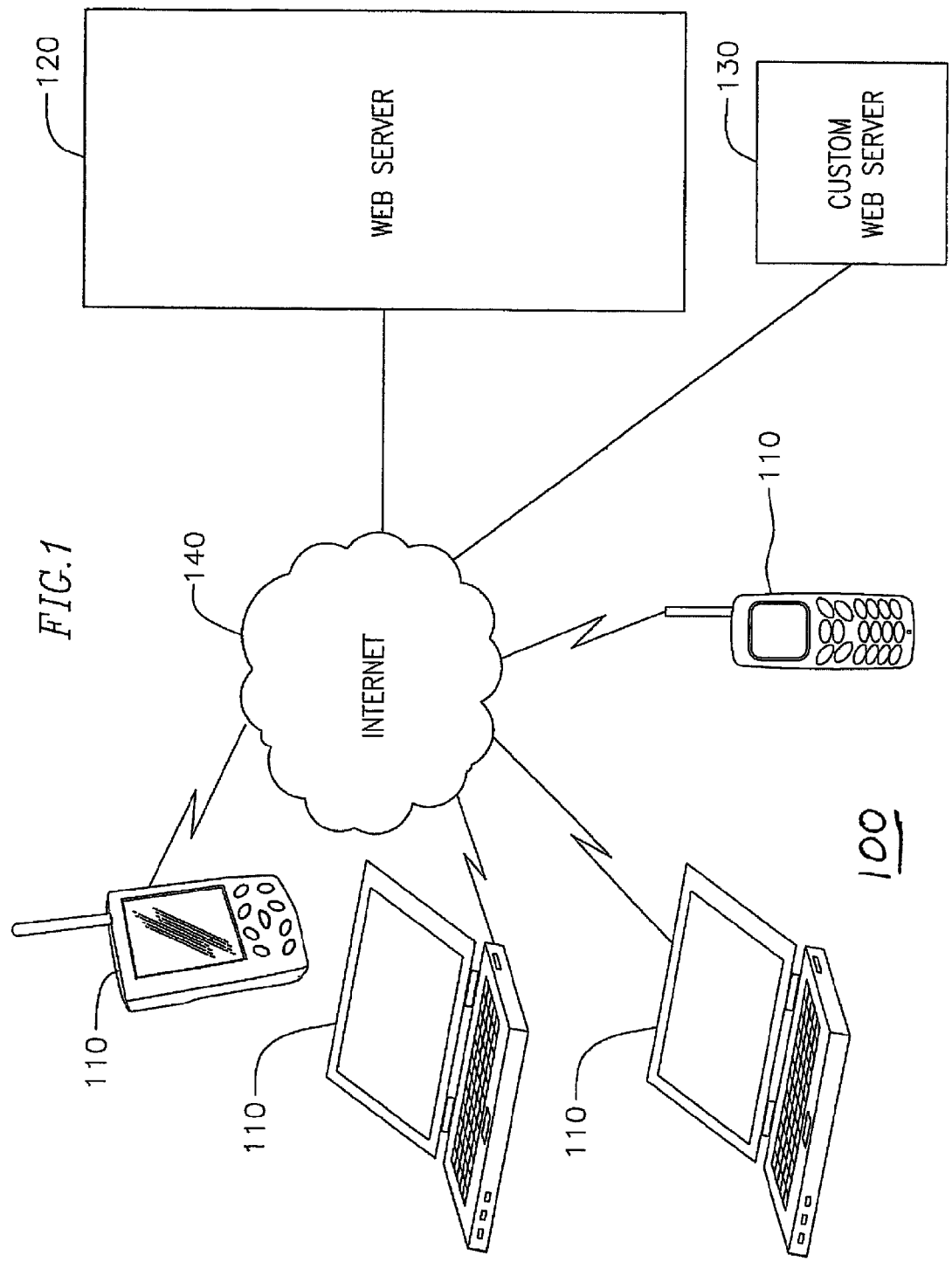
FIG. 1 is a block diagram of a web-based video editing system with flow control according to a first embodiment of the present invention.

FIG. 1 is a block diagram of a web-based video editing system 100 according to a first embodiment of the present invention. The editing system 100 includes at least one communication device 110, a web server 120, a custom web server 130, and a network 140 over which the communication device communicates with the web server and/or the custom web server. The editing system provides flow control of web-based video and video related data.

The communication device may be, for example, a personal computer, a mobile telephone, a PDA or any other communication device configured to operate as a client to a server. The communication device has a graphical user interface (GUI), or allows communication with a GUI, for displaying information. In some embodiments, a user operates the communication device to display interactive web-based video on the graphical user interface. In some embodiments, the communication device has an application for displaying multimedia on the graphical user interface of the client computer. The application may be Adobe Flash® or any other application capable of displaying multimedia.

In some embodiments, the communication device includes software and/or hardware for controlling a web browser. In some embodiments of the system, the communication device is a client computer that transmits information to and receives information from the web server and the custom web server. The communication device may also perform functions in response to information received from the web server and/or the custom web server.

In some embodiments, the communication device determines the resources required to be loaded in the communication device at any selected point in time before or while playing the video. The resources include, but are not limited to, one or more data files or some portion or amount of data in one or more of data files. The data included in data files may represent, for example, audio, video, image, poll, chat, advertisement or photo album data or data associated with one or more elements. In some embodiments, elements are composed of coding that performs a selected function, such as a transition. By way of example, an element may include, but is not limited to, a wipe transition effect or a fade transition effect. In some embodiments, the data may be or include an advertisement.

The data may also be temporal, non-temporal or some combination. Temporal data includes, for example, video, audio, and effects. Non-temporal data includes, for example, photos, images, and polls. Combinations of temporal and non-temporal data includes, for example, text or graphics, including a poll, for example, with integrated, repeating moving or video backgrounds or with text that changes over time. Each data file has an activation and a de-activation time. The activation time is the time at which the data of the data file is played in the video. The de-activation time is the time at which the data of the data file ceases to be played in the video. A data file is active when its activation time has occurred and no de-activation time has occurred. A data file is inactive when its de-activation time has occurred or no activation time has occurred. At any selected time, one or more data files may be active or inactive.

To determine the resources required, the communication device may generate a resource graph to determine points of interest, which are points at which one or more data files become active or inactive, and request 1) only the data of the active data files and 2) only the amount of the data that is necessary for loading for play during a selected time interval. Accordingly, in some embodiments, the communication device is able to facilitate flow control of data in the web-based video editing system.

Figure 2:
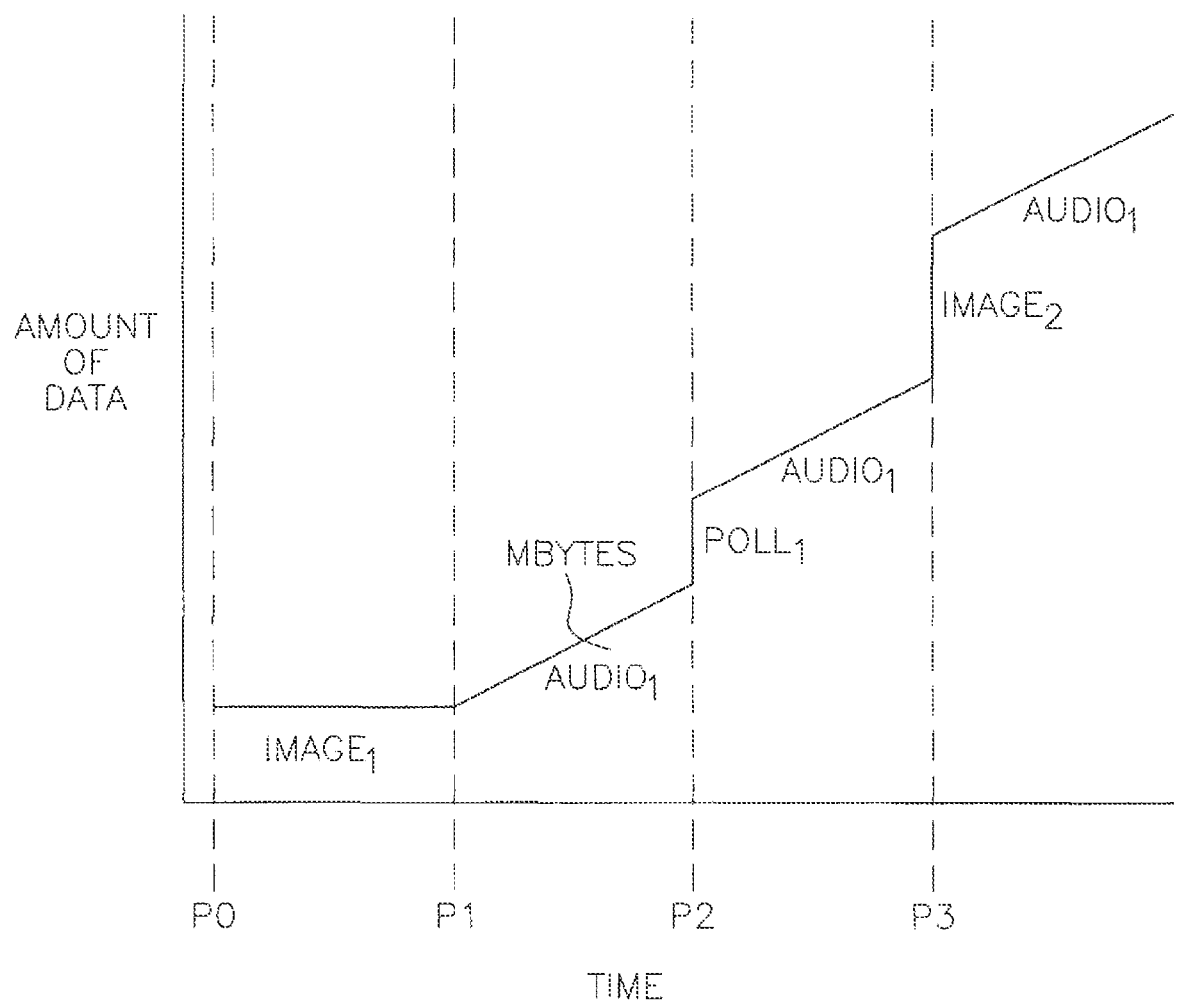
FIG. 2 is a resource graph generated by the communication device of FIG. 1 according to some embodiments of the present invention.

FIG. 2 is a resource graph generated by the communication device of FIG. 1 according to some embodiments of the present invention. Time values are provided along the horizontal axis of the graph and amounts of data values are provided on the vertical axis of the graph. In some embodiments, the communication device analyzes the required data that must be loaded to play the video and generate a resource graph, such as that shown in FIG. 2, to determine points of interest. Points of interests in general are points when the data rate changes are likely or anticipated and often occur when one or more data becomes active or inactive.

In the embodiment shown, the points of interest are p0, p1, p2 and p3. At p0, a first image file becomes actives. At p1, the first image file remains active and a first audio file also becomes active. At p2, the first audio file remains active while the first image file becomes inactive. At p3, a second image file and a first video file become active while the first audio file remains active. Accordingly, in this embodiment, the video displays an image from time p0 to p1, continues to display the image from p1 to p2 while also playing an audio file, ceases to display the first image and displays a second image while continuing to play the audio file and running a poll. As shown in this embodiment, the number of bytes for each data varies according to the data required to be loaded. Accordingly, the communication device determines at each point of interest the identity of the data and the amount of that data required to be loaded for a selected time interval. The selected time interval is p0 to p1, p1 to p2 or p2 to p3 in this embodiment. By requesting only the data and the amount of that data required to be loaded for a selected time interval, the communication device thereby controls the flow of data to the communication device.

If a video included only temporal data, the data rates, such as the data represented by the graph shown in FIG. 2, could be calculated by the web server when the server has an up to date script of the various resources composing the video because the web server has the data for these resources and can determine the data rates for each of the various resources. However, when a non-temporal element is introduced, for example, a poll that will be displayed until the user of the communication device makes an input, the web server loses the ability to calculate the data rate for a video being reproduced by particular communication device. For example, if a video includes a poll followed by some video while an audio track is played regardless, after the data for the poll is downloaded, but before input for the poll is received from the user, the data rate needed by the communication device is the same as the data rate for the audio alone. However, as soon as the poll is over (e.g., some predetermined time after input is received from the user), the data rate will be the sum of the data rate for the audio and the data rate for the video that follows the poll. The information regarding when the communication device receives the poll input is at the communication device, not the web server. Accordingly, in most embodiments, it is preferable to have the communication device determine the prospective data rates rather than the web server. In order for the communication device to determine the prospective data rate, though, it must previously receive or otherwise have data regarding the script of the various resources composing the video and their respective data rates, which may be variable over the temporal length of the resources In some embodiments, the communication device calculates an average data rate (resource/time) of the video. The communication device may buffer data received until the cumulative required amount of data at any selected time is below the average data rate.

Referring back to FIG. 1, in some embodiments, the web server and the custom web server each have a connection manager (not shown) providing a dedicated open socket connection between the connection manager and the communication device. The connection manager determines the condition of the server with which it is in communication and performs asynchronous messaging to the communication device over the dedicated open socket connection. In some embodiments, the content of the messages is indicative of the state of the server. In some embodiments, an HTTP-based proxy mechanism is used in lieu of the socket connection. The HTTP-based proxy mechanism may be used when a direct socket is not feasible.

In some embodiments, the web server receives requests from the communication device and performs functions in response to the received requests. The web server may perform any number of functions typically performed in the server of a web-based video editing system. The server may also provide an editing system for editing video.

The web server receives a request for data of a data file that the communication device needs to load to display the video. The web server then associates the requested data of the data file with a unique identifier. The web server may also set a value for and transmit a cookie having a value that is the unique identifier of the data requested. The web server then sends information to the communication device re-directing the communication device to the custom web server.

The custom web server then receives the re-directed requests from the communication device and performs functions in response to the received requests. The request received by the custom web server may be for a portion of data in a data file and the custom web server would then provide only a portion of data according to the amount of the data requested by the communication device. In some embodiments, the web server communicates the association between the requested data and the unique identifier to the custom web server. In these cases, the custom web server may determine the identity of the requested data by receiving, from the communication device, the unique identifier set by the web server and determining the data requested by the association received from the web server. Alternatively, rather than receiving the associate between the unique identifier and the data from the web server, the custom web server relays the unique identifier, without involvement of the communication device, to the web server and receives either the requested data or the data request from the web server.

Accordingly, in some embodiments, the custom web server only sends the amount of data required for a selected time interval. For example, with reference to FIG. 2, the custom web server only sends m bytes of audio, which is the required amount of audio for the time interval p1 to p2, instead of sending 2 m bytes of audio, which is the required amount of audio for time interval p1 to p3. By limiting the amount of data sent to only that amount that is necessary, bandwidth of a connection between the communication device and the custom web server can be efficiently used as more bandwidth is available for by more bandwidth-intensive data over the selected time interval.

Referring back to FIG. 1, the custom web server may also receive requests for subsequent selected data and selected amounts of such selected data after receiving a first request for the selected data and the amount of the selected data. The custom web server may identify the data by the unique identifier.

The network 140 may be a wireless or a wireline network and may range in size from a local area network to a wide area network to the Internet.

In some embodiments, the system of FIG. 1 also includes a wildcard domain name server (DNS) that receives from the communication device a request to obtain an IP address associated with a domain name. The domain name is part of a URL that identifies a server at which a requested data file is located. URLs include a portion that identifies the protocol to be used, such as "http://" (identifying the hypertext transfer protocol), concatenated with a domain name, such as "www.flektor.com", optionally concatenated with file information, such as "index.html". The domain name portion of a URL is converted into a numerical IP address that is the actual address used by the Internet to direct communications to a particular server connected to the Internet. The conversion from domain name to IP address is performed by one or more DNSs that map domain names or portions of domain names to IP addresses. A domain name includes different levels that are identified working from right to left through the domain name. Accordingly, in "www.flektor.com", the portion to the right of the last "dot," ("com") is known as a top level domain which identifies which of several public DNS tables to use. The domain name to the left of the last dot ("flektor") is known as the second level domain. A DNS using the public .com DNS table looks up "flektor" in that table and outputs the IP address stored in the table for "flektor." The portion of the domain name to the left of the second to last dot, in the example, "www" is known as the third level domain and is sent to the IP address identified by the DNS. A server located at this IP address contains a local DNS table that is used to associate third or greater level domains with particular servers. In many cases, a web server at the IP address in the public DNS table for a second level domain will have a DNS table that simply associates "www" with its own IP address. In other cases, the local DNS table is much more complex and may associate different third level of higher domains, such as "www1" and "www2" with different IP addresses. Once the end (the left end) of the domain name is reached, the server at the IP address associate with the domain name is passed the file portion ("index.html" in the example) that identifies what information on that server is being requested.

The wildcard DNS uses a rule providing that for any wildcard URL containing a selected partial domain name, a selected IP address is provided to the communication device. By way of example, the wildcard DNS may provide the same IP address to a communication device for all URLs containing a third level domain name that begins with the characters "www". In this example, the same IP address will be returned for any URL containing, for example, the domain names www1.flektor.com, www2.flektor.com, or wwwxyz.flektor.com. In this way, one IP address may be used to service URLs with widely varying domain names that are nonetheless considered different web servers by certain software on the communication device.

Figure 3:
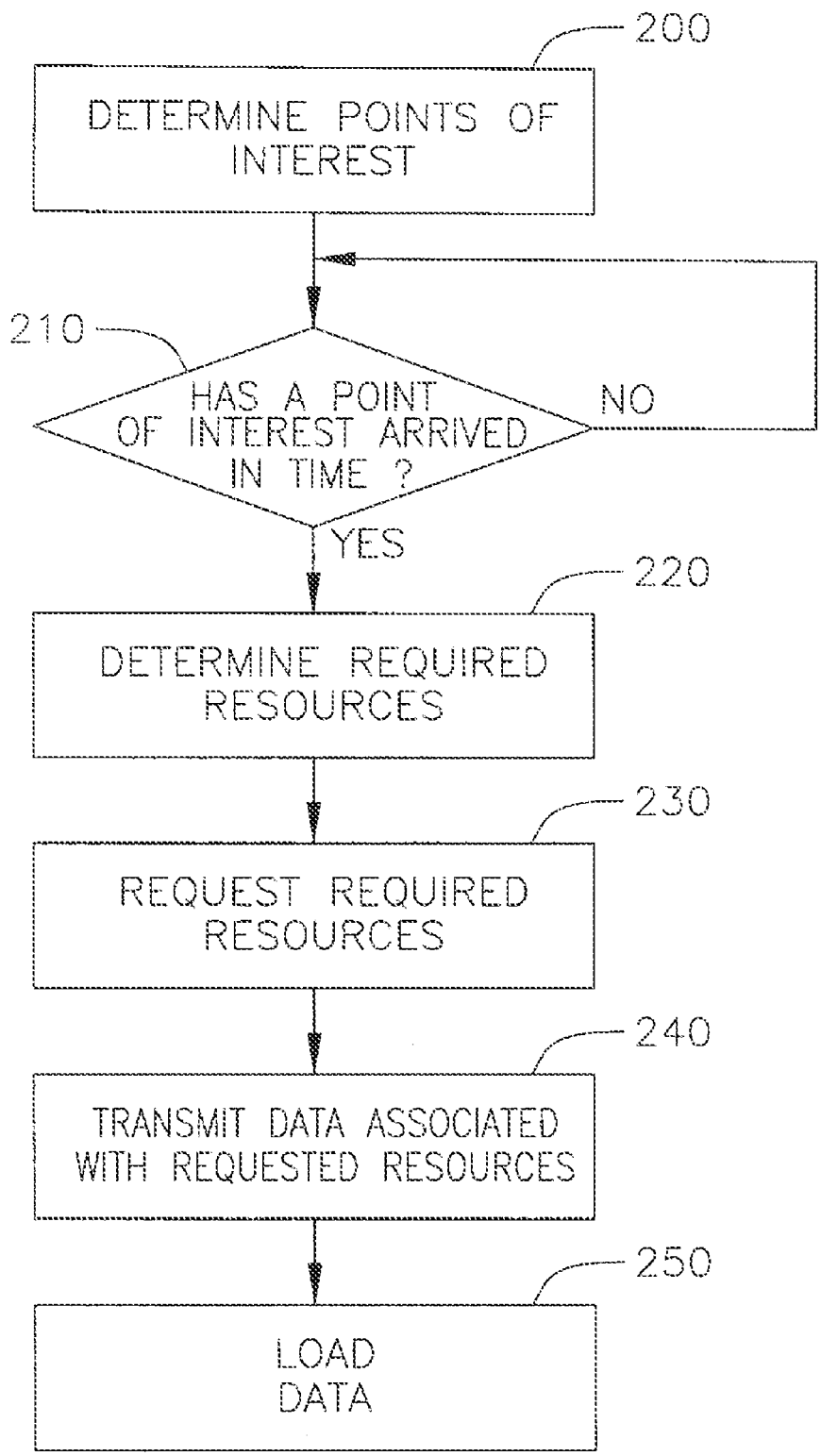
FIG. 3 is a flowchart of a method of operation of a web-based video editing system according to some embodiments of the present invention.

FIG. 3 is a flowchart of a method of operation of the editing system according to some embodiments of the present invention. The communication device determines 200 the points of interest for a selected video. The communication device determines 210 whether the point of interest has arrived in time. In the embodiment shown, if the point of interest has not arrived, the communication device does not request data and a corresponding amount of the data. In some embodiments, if the point of interest has not arrived but the point of interest will arrive within some selected amount of time, the communication device requests data and the corresponding amount of the data. Referring back to FIG. 3, if the point of interest has arrived, the communication device determines 220 the required resources. The required resources are one or more data and the corresponding amount of the one or more data. The communication device requests 230 the required resources. The custom web server transmits 240 to the communication device the data associated with the required resources. The communication device loads 250 the data and plays a portion of the video associated with the data.

Figure 4:
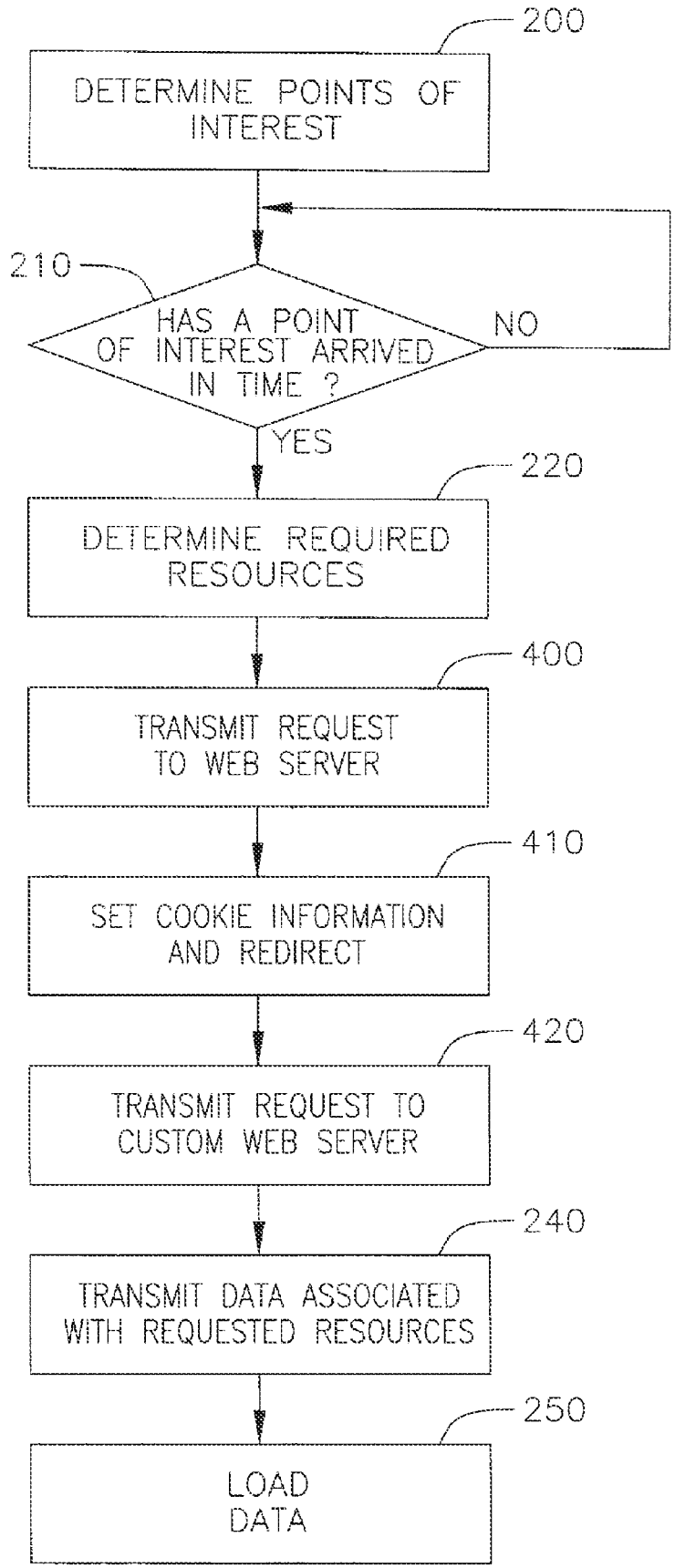
FIG. 4 is a flowchart of another method of operation of a web-based video editing system according to some embodiments of the present invention.

FIG. 4 is a flowchart of another method of operation of the editing system according to some embodiments of the present invention. As in FIG. 3, the communication device determines 200 the points of interest for a selected video. The communication device determines 210 whether the point of interest has arrived in time. In the embodiment shown, if the point of interest has not arrived, the communication device does not request data and a corresponding amount of that data. In some embodiments, if the point of interest has not arrived but the point of interest will arrive within some selected amount of time, the communication device requests data and the corresponding amount of that data. Referring back to FIG. 4, if the point of interest has arrived, the communication device determines 220 the required resources. The required resources are one or more data and a corresponding amount of that data. The communication device transmits 400 to the web server a first instance of a request for a selected form of data. The web server sets 410 a cookie with a value that is a unique identifier of the selected form of data and redirects the communication device to the custom web server. The communication device transmits 420 to the custom web server a second instance of a request for the selected form of data identified by the unique identifier. The custom web server transmits 240 to the communication device the data associated with the required resources. The communication device loads 250 the data and plays a portion of the video associated with the data.

What is claimed is:

1. A public network based video system having flow control, the system comprising:
a network server configured to:
send a data stream representative of an audiovisual sequence, directed to a communication device, via a public network, the audiovisual sequence including one or more temporal elements and one or more non-temporal elements;
include particular elements of the audiovisual sequence in the data stream;
send the data stream, via the public network, directed to the communication device at a data rate according to a data rate requirement;

assign a unique identifier to one of the temporal or non-temporal elements; and
transmit redirection data for the one of the temporal or non-temporal elements and the unique identifier to the communication device; and a communication device configured to:
receive the data stream;
analyze the data stream to determine a timing of presentation of the temporal and non-temporal elements to determine the data rate requirement for a future period of time; and
send a request to the server to send the particular elements of the audiovisual sequence, the request including the data rate requirement for the requested elements the network server further comprising a custom network server, the custom network server configured to:
receive information, according to a redirection information, indicative of the unique identifier and the data rate requirement for each of a one or more identified active data; and
include the particular elements in the data stream; and
send the data stream at the data rate according to the data rate requirement.

2. The system of claim 1 wherein the redirection information for at least two of the elements in the audiovisual sequence includes different domain name server portions of a resource locator.

3. The system of claim 1 wherein the system comprises a video editing system.

4. The system of claim 3 wherein the network server is further configured to: receive instructions to modify the elements to be included in the data stream after the data stream has begun being sent by the network server.

5. The system of claim 1 wherein the communications device comprises at least one selected from the group consisting of: a personal computer, a laptop computer, a handheld computer, a phone, and a video player.

6. The system of claim 1 wherein the public network is the Internet.

7. A public network based video system having flow control, the video system comprising:
a network server comprising a web server configured to:
send a data stream representative of an audiovisual sequence, directed to a communication device, via a public network, the audiovisual sequence including one or more temporal elements and one or more non-temporal elements;
receive information indicative of the one or more of the temporal elements and the one or more non-temporal elements of the audiovisual sequence to be sent in the data stream and a required data rate for indicated elements;
include the indicated elements in the data stream;
send the data stream, via the public network, directed to the communication device at a data rate according to the required data rate while the data stream includes the indicated elements;
assign a unique identifier to one of the temporal or non-temporal elements; and
transmit redirection data for the one of the temporal or non-temporal elements and the unique identifier to the communication device;
the network server further comprising a custom network server configured to:
receive information, according to the redirection data, indicative of the unique identifier and the data rate requirement for each of a one or more identified active data;
include the indicated elements in the data stream; and
send the data stream at a data rate according to the data rate requirement.

8. The system of claim 7 wherein the redirection information for at least two of the elements in the audiovisual sequence includes different domain name server portions of a resource locator.

9. The system of claim 8 wherein the system comprises a video editing system.

10. The system of claim 7 wherein the network server is further configured to:
receive instructions to modify the elements to be included in the data stream after the data stream has begun being sent by the network server.

11. The system of claim 7 wherein the public network is the Internet.

12. A public network video system having flow control, the system comprising:
a communication device configured to:
receive a data stream representative of an audiovisual sequence from a server via a public network, the audiovisual sequence including one or more temporal elements and one or more non-temporal elements;
analyze the data stream to determine a timing of presentation of the temporal and non-temporal elements to determine a data rate requirement for a future period of time; and
send a request to the server for transmission of particular elements of the audiovisual sequence, the request including a data rate requirement for the requested elements.

13. The system of claim 12 wherein the communication device is further configured to receive data indicative of data rates for one or more elements to be included in the data stream.

14. The system of claim 12 wherein the system comprises a video editing system.

15. The system of claim 14 wherein the communication device is further configured to: send instructions to modify the elements to be included in the data stream after the data stream has begun being received by the communication device.

16. The system of claim 12 wherein the communications device comprises at least one selected from the group consisting of: a personal computer, a laptop computer, a handheld computer, a phone, and a video player.

17. The system of claim 12 wherein the public network is the Internet.

18. A method of network based video transmission having flow control, the method comprising:
sending a data stream representative of an audiovisual sequence, from a network server directed to a communication device, via a public network, the audiovisual sequence including one or more temporal elements and one or more non-temporal elements; and
receiving the data stream by the communication device;
analyzing, by the communication device, the data stream to determine a timing of presentation of the temporal and non-temporal elements to determine a data rate requirement for a future period of time;

sending, by the communication device, a request to the server to send particular elements of the audiovisual sequence, the request including a data rate requirement for the requested elements;

including the particular elements in the data stream; and sending the data stream, via the public network, directed to the communication device, by the server at a data rate according to the data rate requirement;

assigning a unique identifier to one of the temporal or non-temporal elements;

transmitting, by the network server, redirection data for the one of the temporal and non-temporal elements and the unique identifier to the communication device;

receiving information, by a custom network server, according to the redirection data, indicative of the unique identifier and the data rate requirement for each of a one or more identified active data;

including the particular elements in the data stream; and sending the data stream at a data rate according to the data rate requirement.

19. The method of claim 18 wherein the redirection information for at least two of the elements in the audiovisual sequence includes different domain name server portions of a resource locator.

20. The method of claim 18 wherein the method comprises a video editing method.

21. The method of claim 20 further comprising: receiving instructions to modify the elements to be included in the data stream after the data stream has begun being sent by the network server.

22. The method of claim 18 wherein the communications device comprises at least one selected from the group consisting of: a personal computer, a laptop computer, a handheld computer, a phone, and a video player.

23. The method of claim 18 wherein the public network is the Internet.

\* \* \* \* \*